(12) United States Patent
Akar et al.

(10) Patent No.: US 11,210,347 B2
(45) Date of Patent: Dec. 28, 2021

(54) OBJECT SEARCH WITH PAGINATION AND NON-DUPLICATES SUPPORT

(71) Applicant: Citrix Systems, Inc., Fort Lauderdale, FL (US)

(72) Inventors: Esad Muhlis Akar, Coral Springs, FL (US); Javier A. Azaret, Fort Lauderdale, FL (US); Bruno Spinelli Dantas, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 308 days.

(21) Appl. No.: 16/573,324

(22) Filed: Sep. 17, 2019

(65) Prior Publication Data

US 2021/0081455 A1 Mar. 18, 2021

(51) Int. Cl.
*G06F 16/9035* (2019.01)
*G06F 16/901* (2019.01)
*G06F 16/9038* (2019.01)

(52) U.S. Cl.
CPC ...... *G06F 16/9035* (2019.01); *G06F 16/9014* (2019.01); *G06F 16/9038* (2019.01)

(58) Field of Classification Search
CPC ............. G06F 16/9035; G06F 16/9014; G06F 16/9038
See application file for complete search history.

(56) References Cited

U.S. PATENT DOCUMENTS

| 5,504,892 | A | * | 4/1996 | Atsatt | G06F 16/10 707/822 |
| 7,085,834 | B2 | * | 8/2006 | Delany | G06F 21/41 707/999.009 |
| 7,440,964 | B2 | * | 10/2008 | Gosse | G06F 16/951 |
| 9,514,199 | B1 | * | 12/2016 | Deprey | G06F 16/957 |
| 2005/0102297 | A1 | * | 5/2005 | Lloyd | H04L 61/1552 |
| 2011/0264781 | A1 | * | 10/2011 | Moser | H04L 61/1523 709/223 |

* cited by examiner

*Primary Examiner* — Pierre M Vital
*Assistant Examiner* — Zuheir A Mheir
(74) *Attorney, Agent, or Firm* — Daly, Crowley, Mofford & Durkee, LLP

(57) ABSTRACT

Techniques are disclosed for querying for members in multiple groups. A list of unique members in the multiple groups may be received in response to the query. An example methodology implementing the techniques may include generating a group contexts dictionary and a job stack. The group contexts dictionary may include group context objects, each group context object associated with a group within a domain. The job stack may include one or more group context hashset keys, wherein a group context hashset key identifies a group context object. The method may include retrieving one or more group context hashset keys from the job stack and, for each retrieved group context hashset key, traversing a group associated with a group context object identified by a group context hashset key to determine membership information of the group, and generating a list of unique members by removing duplicate entries in the membership information.

17 Claims, 10 Drawing Sheets

| Group Context Object |
| --- |
| ObjectId<br>State<br>Skip<br>DirectoryContext |

FIG. 6A

Group Contexts Hashset

| Key | Value |
| --- | --- |
| GoupId+DirectoryContext | Group Context Object |
| GoupId+DirectoryContext | Group Context Object |
| ... | ... |

FIG. 6B

Job Stack

| Value |
| --- |
| Group Context Hashset Key |
| Group Context Hashset Key |
| ... |

FIG. 6C

OBJECT SEARCH WITH PAGINATION AND NON-DUPLICATES SUPPORT

BACKGROUND

Electronic directory providers, such as Microsoft's Active Directory®, Microsoft's Azure Active Directory®, Apache Software Foundation's Apache Directory™, and OpenLDAP®, allow for organizing objects into nested structures called groups. A group can contain a collection of objects, such as users and other groups as members. For example, in the context of network administration, working with groups instead of with individual users helps simplify network maintenance and administration. To this end, these directory providers allow a user to query the directory for the members in a group. However, these directory providers allow the user to only query for the list of members in a single group. For example, assuming two groups, Group A and Group B, the user needs to make two different queries, one query for the list of members in Group A and another query for the list of members in Group B in order to determine the members in both groups. Also, in the case where an object is included multiple times in a group or within nested groups (e.g., where a group is nested within another group), a query for the list of members in a particular group, the returned list will unnecessarily include or otherwise identify the object a repeated number of times. For directories with a large number of groups, having to make many queries can be cumbersome and frustrating to a user. Also, the possibility of repeated or duplicate entries in the query result is likely to further user frustration in using the directory.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one example embodiment provided to illustrate the broader concepts, systems, and techniques described herein, a method may include, responsive to a query for members in a plurality of groups, generating a group contexts dictionary and a job stack. The group contexts dictionary may include a plurality of group context objects, each group context object being associated with a group within a domain. The job stack may include one or more group context hashset keys, wherein a group context hashset key identifies a group context object. The method may also include retrieving one or more group context hashset keys from the job stack and, for each retrieved group context hashset key from the job stack, traversing a group associated with a group context object identified by a group context hashset key to determine membership information of the group. The method may further include generating a list of unique members by removing duplicate entries in the membership information and causing generation of a response to the query for members in the plurality of groups, the response including the list of unique members.

In one aspect, the list of unique members may be paginated group membership information, and the method may further include generating a list of members returned, wherein the list includes the members in the plurality of groups returned in response to one or more previous queries. The method may also include saving the group contexts dictionary, the job stack, and the list of members returned to a cache, generating a continuation token, the continuation token including information for restoring a state of the traversals of the groups, and including the continuation token with the response to the query for members in the plurality of groups such that the continuation token may be included in a subsequent query for additional members in the plurality of groups.

In one aspect, the method may also include, responsive to a subsequent query for members in the plurality of groups, the query including a continuation token, wherein the continuation token includes information for restoring a state of the traversals of the groups, restoring the group contexts dictionary and the job stack from a cache based on the continuation token, and resuming the traversals of the groups based on the restored group contexts dictionary and the job stack to determine membership information of the groups.

In one aspect, traversing a group may yield a nested group, and the method may also include, responsive to a determination that the nested group is not in the group contexts dictionary, including the nested group in the group contexts dictionary and pushing a group context hashset key identifying a group context object associated with the nested group onto the job stack.

In one aspect, the retrieved group context hashset keys may include a first group context hashset key identifying a first group context object associated with a first group and a second group context hashset key identifying a second group context object associated with a second group, and the method may also include traversing the first group by issuing a first query to a directory provider for members of the first group, and traversing the second group by issuing a second query to the directory provider for members of the second group.

In one aspect, the first query and the second query may be issued in parallel.

In one aspect, traversing a group may include issuing a query to a directory provider for members of the group, wherein the query specifies a take value.

In one aspect, generating a list of unique members may include comparing the membership information with a list of members returned, identifying matching entries in the membership information, and removing the identified matching entries from the membership information.

In one aspect, the method may also include, responsive to a determination that a group traversal yields less than a requested take value number of members, marking the group context object associated with the group as being exhausted and discarding the group context object.

In one aspect, the method may also include, responsive to a determination that a group traversal returns no result, marking the group context object associated with the group as being not found and discarding the group context object.

In one aspect, the method may also include, responsive to a determination that a group traversal returns at least a requested take value number of members, marking the group context object associated with the group as being in progress and updating a skip value associated with the group context object. The skip value may indicate a number of members in the group to skip for subsequent queries for members in the plurality of groups.

In one aspect, the method may also include identifying a plurality of domains and traversing the plurality of groups within each of the plurality of domains to determine membership information of the plurality of groups for each of the plurality of domains.

According to another example embodiment provided to illustrate the broader concepts described herein, a non-transitory machine-readable medium may encode instructions that when executed by one or more processors cause a process to be carried out. The process may include, responsive to a query for members in a plurality of groups, generating a group contexts dictionary and a job stack. The group contexts dictionary may include a plurality of group context objects, each group context object being associated with a group within a domain. The job stack may include one or more group context hashset keys, wherein a group context hashset key identifies a group context object. The process may also include retrieving one or more group context hashset keys from the job stack and, for each retrieved group context hashset key from the job stack, traversing a group associated with a group context object identified by a group context hashset key to determine membership information of the group. The process may further include generating a list of unique members by removing duplicate entries in the membership information and causing generation of a response to the query for members in the plurality of groups, the response including the list of unique members.

In one aspect, the list of unique members may be paginated group membership information, and the process may further include generating a list of members returned, wherein the list includes the members in the plurality of groups returned in response to one or more previous queries. The process may also include saving the group contexts dictionary, the job stack, and the list of members returned to a cache, generating a continuation token, the continuation token including information for restoring a state of the traversals of the groups, and including the continuation token with the response to the query for members in the plurality of groups such that the continuation token may be included in a subsequent query for additional members in the plurality of groups.

In one aspect, the process may also include, responsive to a subsequent query for members in the plurality of groups, the query including a continuation token, wherein the continuation token includes information for restoring a state of the traversals of the groups, restoring the group contexts dictionary and the job stack from a cache based on the continuation token, and resuming the traversals of the groups based on the restored group contexts dictionary and the job stack to determine membership information of the groups.

In one aspect, traversing a group may yield a nested group, and the process may also include, responsive to a determination that the nested group is not in the group contexts dictionary, including the nested group in the group contexts dictionary and pushing a group context hashset key identifying a group context object associated with the nested group onto the job stack.

According to another example embodiment provided to illustrate the broader concepts described herein, a system includes a memory and one or more processors in communication with the memory. The processor may be configured to, responsive to a query for members in a plurality of groups, generate a group contexts dictionary and a job stack. The group contexts dictionary may include a plurality of group context objects, each group context object being associated with a group within a domain. The job stack may include one or more group context hashset keys, wherein a group context hashset key identifies a group context object. The processor may also be configured to retrieve one or more group context hashset keys from the job stack and, for each retrieved group context hashset key from the job stack, traverse a group associated with a group context object identified by a group context hashset key to determine membership information of the group. The processor may further be configured to generate a list of unique members by removing duplicate entries in the membership information and cause generation of a response to the query for members in the plurality of groups, the response including the list of unique members.

In one aspect, the list of unique members may be paginated group membership information, and the processor may also be configured to generate a list of members returned, wherein the list includes the members in the plurality of groups returned in response to one or more previous queries. The processor may also be configured to save the group contexts dictionary, the job stack, and the list of members returned to a cache, generate a continuation token, the continuation token including information for restoring a state of the traversals of the groups, and include the continuation token with the response to the query for members in the plurality of groups such that the continuation token may be included in a subsequent query for additional members in the plurality of groups.

In one aspect, the processor may also be configured to, responsive to a subsequent query for members in the plurality of groups, the query including a continuation token, wherein the continuation token includes information for restoring a state of the traversals of the groups, restore the group contexts dictionary and the job stack from a cache based on the continuation token, and resume the traversals of the groups based on the restored group contexts dictionary and the job stack to determine membership information of the groups.

In one aspect, traversing a group may yield a nested group, and the processor may also be configured to, responsive to a determination that the nested group is not in the group contexts dictionary, include the nested group in the group contexts dictionary and push a group context hashset key identifying a group context object associated with the nested group onto the job stack.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 6A is a diagram showing an example group context object, in accordance with an embodiment of the present disclosure.

FIG. 6B is a diagram showing an example group contexts hashset, in accordance with an embodiment of the present disclosure.

FIG. 6C is a diagram showing an example job stack, in accordance with an embodiment of the present disclosure.

DETAILED DESCRIPTION

Figure 1:
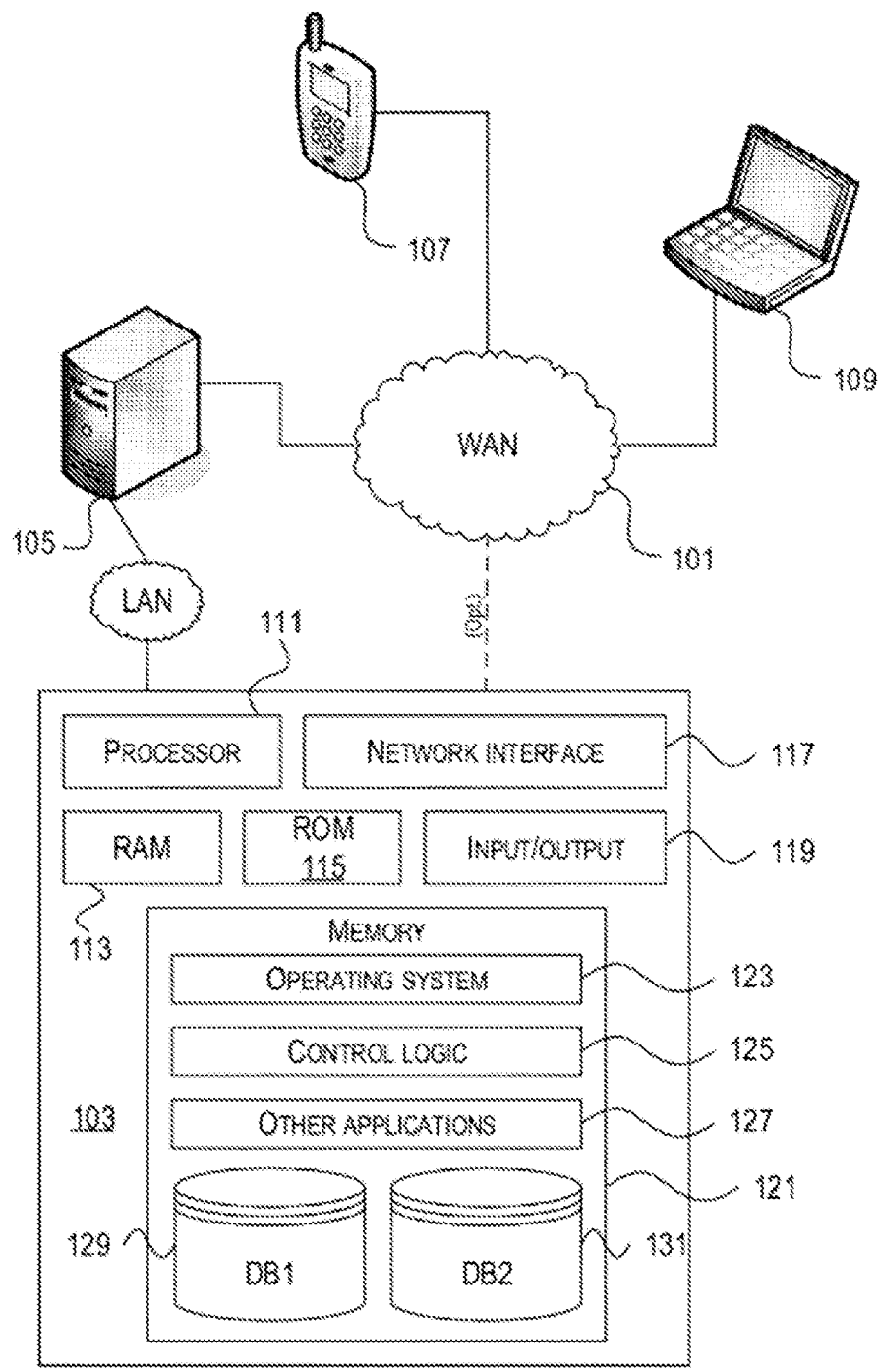
FIG. 1 depicts an illustrative computer system architecture that may be used in accordance with one or more illustrative aspects of the concepts described herein.

In accordance with certain of the embodiments disclosed herein, improved distributed search techniques enable querying for members in multiple groups and, in response, receiving a list of members in the specified groups in which each member in the list is identified only once. In other words, the returned list of members does not include any duplicate or repeated entries. Group membership determination is achieved by querying a directory provider for members in a specified group and obtaining the group members. In one embodiment, the directory provider query capabilities are provided by a directory service. In such embodiments, a caller can use the directory service to query for members in multiple groups. In response, the directory service can issue multiple queries to the directory provider for members in the specified groups. For example, one query may be made to determine the group membership of one group of the specified groups. In this manner, the directory service can traverse the groups to determine group membership information. In an embodiment, the multiple queries for the members in the specified groups may be made in parallel. Obtaining the membership information of a group may yield the users and subgroups (i.e., nested groups) in the group. The subgroups can yield additional users and subgroups. For each nested group, the directory service can query the directory provider for membership information of the nested group. Once the group membership information is obtained from the directory provider, directory service can process the group membership information to identify and remove duplicate entries (e.g., users identified multiple times) from the group membership information. The directory service can then provide or otherwise make available the group membership information, which includes a list of unique members in the specified groups, to the caller.

In some embodiments, the directory service is configured to facilitate the traversal of multiple groups in multiple directory provider domains or so-called directory provider contexts. A directory provider domain (sometimes referred to herein more simply as a domain) may refer to a logical grouping of objects (e.g., users, groups, etc.) that share the same directory structure, where each object in the domain can be uniquely identified. In some cases, the multiple domains may be provided by the same directory provider. In other cases, some of the domains may be provided by different directory providers. In any such cases, a caller may use the directory service to query for the members in multiple groups without specifying a domain. In such cases, the directory service may identify the domains that are known or otherwise supported by the directory service and traverse the multiple groups within each domain to determine the group membership of the specified groups for each of the identified domains. In an embodiment, the traversal of the multiple groups in the different domains for the members in the specified groups may be performed in parallel.

In some embodiments, the directory service is configured to facilitate pagination of the group membership information returned or otherwise provided to a caller in response to a query. For example, it may be the case that a query specifies a large number of groups or that the groups include large numbers of users. In such embodiments, the directory service may paginate or otherwise limit the number members returned to the caller in the response and, if there are potentially additional members in the specified groups, provide a continuation token with the response for use in a subsequent query for additional members in the specified groups (e.g., to obtain additional group membership information). For example, the directory service may return one page or a suitable number of pages of membership information at a time. The continuation token includes information regarding the state of the traversals of the groups at the time of generating the paginated group membership information. When provided with a subsequent query to the directory service, the directory service can use the continuation token to restore the state of the traversals of the groups so that the groups that have previously been traversed to determine group membership are not traversed again. In other words, the directory service can use the continuation token to restore the state of the traversals of the groups and resume the traversals of the groups from or otherwise based on the restored state to determine group membership. It will be appreciated in light of this disclosure that paginating the group membership information allows for enhanced efficiency in that group membership information is provided to a caller in a relatively short amount of time. Also, providing a list of unique members in the specified groups enhances the usefulness of the group membership information. These and other advantages and alternative embodiments will be apparent in light of this disclosure.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects of the concepts described herein in a standalone and/or networked environment. Various network node devices 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topologies and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components and devices which make up the system of FIG. 1 may include a data server 103, a web server 105, and client computers 107, 109. Data server 103 provides overall access, control and administration of databases and control software for performing one or more illustrative aspects of the concepts described herein. Data server 103 may be connected to web server 105 through which users interact with and obtain data as requested. Alternatively, data server 103 may act as a web server itself and be directly connected to the Internet. Data server 103 may be connected to web server 105 through local area network 133, wide area network 101 (e.g., the Internet), via direct or indirect connection, or via some other network. Users may interact with data server 103 using remote computers 107, 109, e.g., using a web browser to connect to data server 103 via one or more externally exposed web sites hosted by web server 105. Client computers 107, 109 may be used in concert with data server 103 to access data stored therein or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used in the system architecture and data processing device of FIG. 1, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of data server 103. Data server 103 may further include a random access memory (RAM) 113, a read only memory (ROM) 115, a network interface 117, input/output interfaces 119 (e.g., keyboard, mouse, display, printer, etc.), and a memory 121. Input/output (I/O) interfaces 119 may include a variety of interface units and drives for reading, writing, displaying, and/or printing data or files. Memory 121 may store operating system software 123 for controlling overall operation of the data server 103, control logic 125 for instructing data server 103 to perform aspects of the concepts described herein, and other application software 127 providing secondary, support, and/or other functionality which may or might not be used in conjunction with aspects of the concepts described herein. Control logic 125 may also be referred to herein as the data server software. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the concepts described herein. Memory 121 may include, for example, a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to data server 103. Those of skill in the art will appreciate that the functionality of data server 103 (or device 105, 107, or 109) as described herein may be spread across multiple data processing devices, for example, to distribute processing load across multiple computers, to segregate transactions based on geographic location, user access level, quality of service (QoS), etc.

One or more aspects of the concepts described here may be embodied as computer-usable or readable data and/or as computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution or may be written in a scripting language such as (but not limited to) Hypertext Markup Language (HTML) or Extensible Markup Language (XML). The computer executable instructions may be stored on a computer readable storage medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source node and a destination node (e.g., the source node can be a storage or processing node having information stored therein which information can be transferred to another node referred to as a "destination node"). The media can be transferred in the form of electromagnetic waves traveling through signal-conducting media such as metal wires, optical fibers, and/or wireless transmission media (e.g., air and/or space). Various aspects of the concepts described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects of the concepts described herein, and such data structures are contemplated within the scope of computer executable instructions and computer-usable data described herein.

Figure 2:
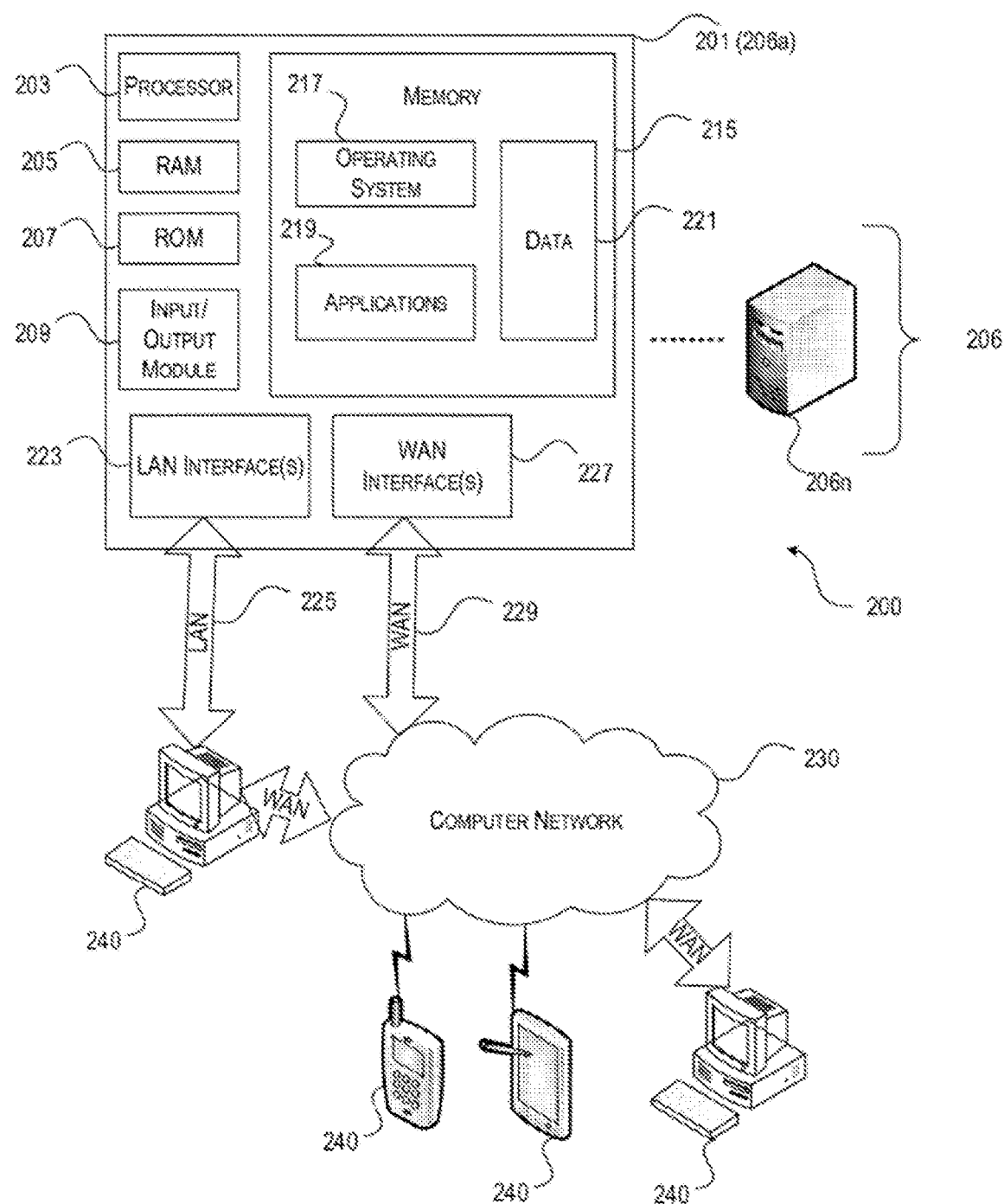
FIG. 2 depicts an illustrative remote-access system architecture that may be used in accordance with one or more illustrative aspects of the concepts described herein.

With further reference to FIG. 2, one or more aspects of the concepts described herein may be implemented in a remote-access environment. FIG. 2 depicts an example system architecture including a computing device 201 in an illustrative computing environment 200 that may be used according to one or more illustrative aspects of the concepts described herein. Computing device 201 may be used as a server 206a in a single-server or multi-server desktop virtualization system (e.g., a remote access or cloud system) configured to provide virtual machines (VMs) for client access devices. Computing device 201 may have a processor 203 for controlling overall operation of the server and its associated components, including a RAM 205, a ROM 207, an input/output (I/O) module 209, and a memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). Terminals 240 may be personal computers, mobile devices, laptop computers, tablets, or servers that include many or all the elements described above with respect to data server 103 or computing device 201. The network connections depicted in FIG. 2 include a local area network (LAN) 225 and a wide area network (WAN) 229 but may also include other networks. When used in a LAN networking environment, computing device 201 may be connected to LAN 225 through an adapter or network interface 223. When used in a WAN networking environment, computing device 201 may include a modem or other wide area network interface 227 for establishing communications over WAN 229, such as to computer network 230 (e.g., the Internet). It will be appreciated that the network connections shown are illustrative and other means of establishing a communication link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects of the concepts described herein may also be operational with numerous other general purpose or special purpose computing system environments or configurations. Examples of other computing systems, environments, and/or configurations that may be suitable for use with aspects of the concepts described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more terminals 240 may be in communication with one or more servers 206a-206n (generally referred to herein as "server(s) 206"). In one embodiment, computing environment 200 may include a network appliance installed between server(s) 206 and terminals 240. The network appliance may manage client/server connections, and in some cases can load balance client connections amongst a plurality of back-end servers 206.

Terminals 240 may in some embodiments be referred to as a single computing device or a single group of client computing devices, while server(s) 206 may be referred to as a single server 206 or a group of servers 206. In one embodiment, a single terminal 240 communicates with more than one server 206, while in another embodiment a single server 206 communicates with more than one terminal 240. In yet another embodiment, a single terminal 240 communicates with a single server 206.

Terminal 240 can, in some embodiments, be referred to as any one of the following non-exhaustive terms: client machine(s); client(s); client computer(s); client device(s); client computing device(s); local machine; remote machine; client node(s); endpoint(s); or endpoint node(s). Server 206, in some embodiments, may be referred to as any one of the following non-exhaustive terms: server(s), local machine; remote machine; server farm(s), or host computing device(s).

In one embodiment, terminal 240 may be a VM. The VM may be any VM, while in some embodiments the VM may be any VM managed by a Type 1 or Type 2 hypervisor, for example, a hypervisor developed by Citrix Systems, IBM, VMware, or any other hypervisor. In some aspects, the VM may be managed by a hypervisor, while in other aspects the VM may be managed by a hypervisor executing on server 206 or a hypervisor executing on terminal 240.

Some embodiments include a terminal, such as terminal 240, that displays application output generated by an application remotely executing on a server, such as server 206, or other remotely located machine. In these embodiments, terminal 240 may execute a VM receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

Server 206, in some embodiments, uses a remote presentation protocol or other program to send data to a thin-client or remote-display application executing on the client to present display output generated by an application executing on server 206. The thin-client or remote-display protocol can be any one of the following non-exhaustive list of protocols: the Independent Computing Architecture (ICA) protocol developed by Citrix Systems, Inc. of Fort Lauderdale, Fla.; or the Remote Desktop Protocol (RDP) manufactured by Microsoft Corporation of Redmond, Wash.

A remote computing environment may include more than one server 206a-206n logically grouped together into a server farm 206, for example, in a cloud computing environment. Server farm 206 may include servers 206a-206n that are geographically dispersed while logically grouped together, or servers 206a-206n that are located proximate to each other while logically grouped together. Geographically dispersed servers 206a-206n within server farm 206 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, server farm 206 may be administered as a single entity, while in other embodiments server farm 206 can include multiple server farms.

In some embodiments, server farm 206 may include servers that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server, a master application server, a server executing an active directory, or a server executing an application acceleration program that provides firewall functionality, application functionality, or load balancing functionality. Other server types may also be used.

Some embodiments include a first server 206a that receives requests from terminal 240, forwards the request to a second server 206b (not shown), and responds to the request generated by terminal 240 with a response from second server 206b (not shown). First server 206a may acquire an enumeration of applications available to terminal 240 as well as address information associated with an application server 206 hosting an application identified within the enumeration of applications. First server 206a can present a response to the client's request using a web interface and communicate directly with terminal 240 to provide terminal 240 with access to an identified application. One or more terminals 240 and/or one or more servers 206 may transmit data over network 230, e.g., network 101.

Figure 3:
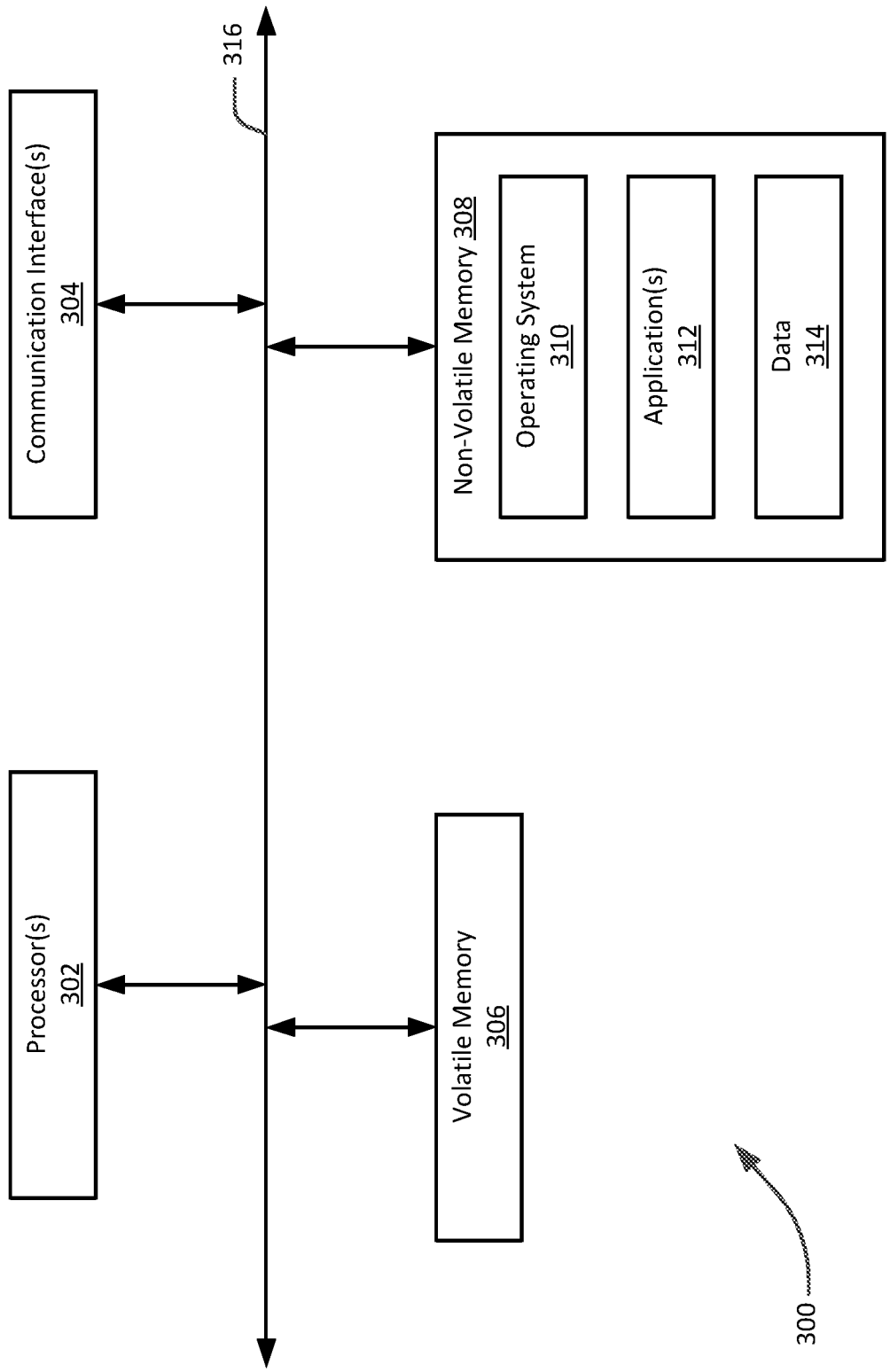
FIG. 3 is a block diagram illustrating selective components of an example computing device in which various aspects of the disclosure may be implemented, in accordance with an embodiment of the present disclosure.

FIG. 3 is a block diagram illustrating selective components of an example computing device 300 in which various aspects of the disclosure may be implemented, in accordance with an embodiment of the present disclosure. Computing device 300 is shown merely as an example of components 105, 107, and 109 of FIG. 1, terminals 240 of FIG. 2, and/or client computers 411-414 of FIG. 4, for instance. However, the illustrated computing device 300 is shown merely as an example and one skilled in the art will appreciate that components 105, 107, and 109 of FIG. 1, terminals 240 of FIG. 2, and/or client computers 411-414 of FIG. 4 may be implemented by any computing or processing environment and with any type of machine or set of machines that may have suitable hardware and/or software capable of operating as described herein.

As shown in FIG. 3, computing device 300 includes one or more processor(s) 302, one or more communication interface(s) 304, a volatile memory 306 (e.g., random access memory (RAM)), a non-volatile memory 308, and a communications bus 316.

Non-volatile memory 308 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

Non-volatile memory 308 stores an operating system 310, one or more applications 312, and data 314 such that, for example, computer instructions of operating system 310 and/or applications 312 are executed by processor(s) 302 out of volatile memory 306. For example, in some embodiments, applications 312 may cause computing device 300 to implement functionality in accordance with the various embodiments and/or examples with respect to the directory service described herein. In some embodiments, volatile memory 306 may include one or more types of RAM and/or a cache memory that may offer a faster response time than a main memory. Data may be entered using an input device of computing device 300 or received from I/O device(s) communicatively coupled to computing device 300. Various elements of computing device 300 may communicate via communications bus 316.

Processor(s) 302 may be implemented by one or more programmable processors to execute one or more executable instructions, such as applications 312 and/or a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, processor 302 can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 302 may be analog, digital or mixed signal. In some embodiments, processor 302 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communication interface(s) 304 may include one or more interfaces to enable computing device 300 to access a computer network such as a Local Area Network (LAN), a Wide Area Network (WAN), a Personal Area Network (PAN), or the Internet through a variety of wired and/or wireless connections, including cellular connections.

In described embodiments, computing device 300 may execute an application on behalf of a user of a client device. For example, computing device 300 may execute one or more virtual machines managed by a hypervisor. Each virtual machine may provide an execution session within which applications execute on behalf of a user or a client device, such as a hosted desktop session. Computing device 300 may also execute a terminal services session to provide a hosted desktop environment. Computing device 300 may provide access to a remote computing environment including one or more applications, one or more desktop applications, and one or more desktop sessions in which one or more applications may execute.

For example, in some embodiments, a first computing device 300 may execute an application on behalf of a user of a client computing device (e.g., client 107 or 109 of FIG. 1), may execute a VM, which provides an execution session within which applications execute on behalf of a user or a client computing device (e.g., any of client computers 411-414 of FIG. 4), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
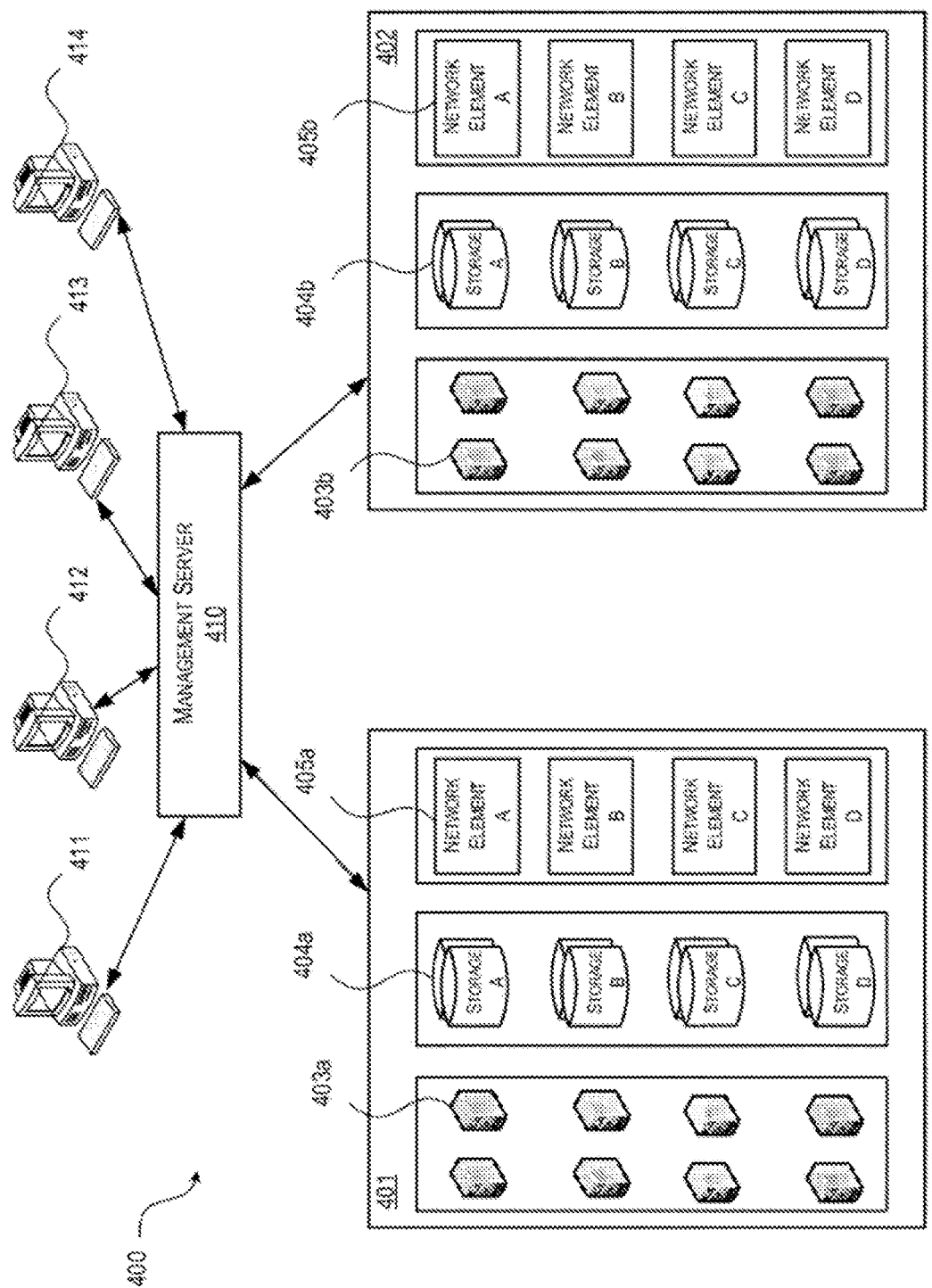
FIG. 4 depicts an illustrative cloud-based system architecture that may be used in accordance with one or more illustrative aspects of the concepts described herein.

With reference to FIG. 4, some aspects of the concepts described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b generally referred to herein as "host servers 403"), storage resources 404a-404b (generally referred to herein as "storage resources 404"), and network resources 405a-405b (generally referred to herein as "network resources 405") of the cloud system.

Management server 410 may be implemented on one or more physical servers. Management server 410 may include, for example, a cloud computing platform or solution, such as APACHE CLOUDSTACK by Apache Software Foundation of Wakefield, Mass., among others. Management server 410 may manage various computing resources, including cloud hardware and software resources, for example, host servers 403, storage resources 404, and network resources 405. The cloud hardware and software resources may include private and/or public components. For example, a cloud environment may be configured as a private cloud environment to be used by one or more customers or client computers 411-414 and/or over a private network. In other embodiments, public cloud environments or hybrid public-private cloud environments may be used by other customers over an open or hybrid networks.

Management server 410 may be configured to provide user interfaces through which cloud operators and cloud customers may interact with cloud system 400. For example, management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. Management server 410 also may include a set of APIs and/or one or more customer console applications with user interfaces configured to receive cloud computing requests from end users via client computers 411-414, for example, requests to create, modify, or destroy VMs within the cloud environment. Client computers 411-414 may connect to management server 410 via the Internet or some other communication network and may request access to one or more of the computing resources managed by management server 410. In response to client requests, management server 410 may include a resource manager configured to select and provision physical resources in the hardware layer of the cloud system based on the client requests. For example, management server 410 and additional components of the cloud system may be configured to provision, create, and manage VMs and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain client computers 411-414 may be related, for example, different client computers creating VMs on behalf of the same end user, or different users affiliated with the same company or organization. In other examples, certain client computers 411-414 may be unrelated, such as users affiliated with different companies or organizations. For unrelated clients, information on the VMs or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud computing resources. For example, zone 401 may be a first cloud datacenter located in California and zone 402 may be a second cloud datacenter located in Florida. Management server 410 may be located at one of the availability zones, or at a separate location. Each zone may include an internal network that interfaces with devices that are outside of the zone, such as management server 410, through a gateway. End users of the cloud environment (e.g., client computers 411-414) might or might not be aware of the distinctions between zones. For example, an end user may request the creation of a VM having a specified amount of memory, processing power, and network capabilities. Management server 410 may respond to the user's request and may allocate resources to create the VM without the user knowing whether the VM was created using resources from zone 401 or zone 402. In other examples, the cloud system may allow end users to request that VMs (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone (e.g., cloud zone 401-402) may include one or more host servers 403, such as server 206 (FIG. 2), which may be configured to create and host VM instances. The physical network resources in cloud zone 401 or 402 may include one or more network resources 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in cloud zone 401-402 may include storage disks (e.g., solid state drives (SSDs), magnetic hard disks, etc.) and other storage devices.

The example cloud computing environment 400 shown in FIG. 4 also may include a virtualization layer with additional hardware and/or software resources configured to create and manage VMs and provide other services to customers using the physical resources in the cloud environment. The virtualization layer may include hypervisors, as described above in connection with FIG. 2, along with other components to provide network virtualizations, storage virtualizations, etc. The virtualization layer may be as a separate layer from the physical resource layer or may share some or all the same hardware and/or software resources with the physical resource layer. For example, the virtualization layer may include a hypervisor installed in each of host servers 403 with the physical computing resources. Known cloud systems may alternatively be used, e.g., WINDOWS AZURE (Microsoft Corporation of Redmond, Wash.), AMAZON EC2 (Amazon.com Inc. of Seattle, Wash.), IBM BLUE CLOUD (IBM Corporation of Armonk, N.Y.), or others.

Figure 5:
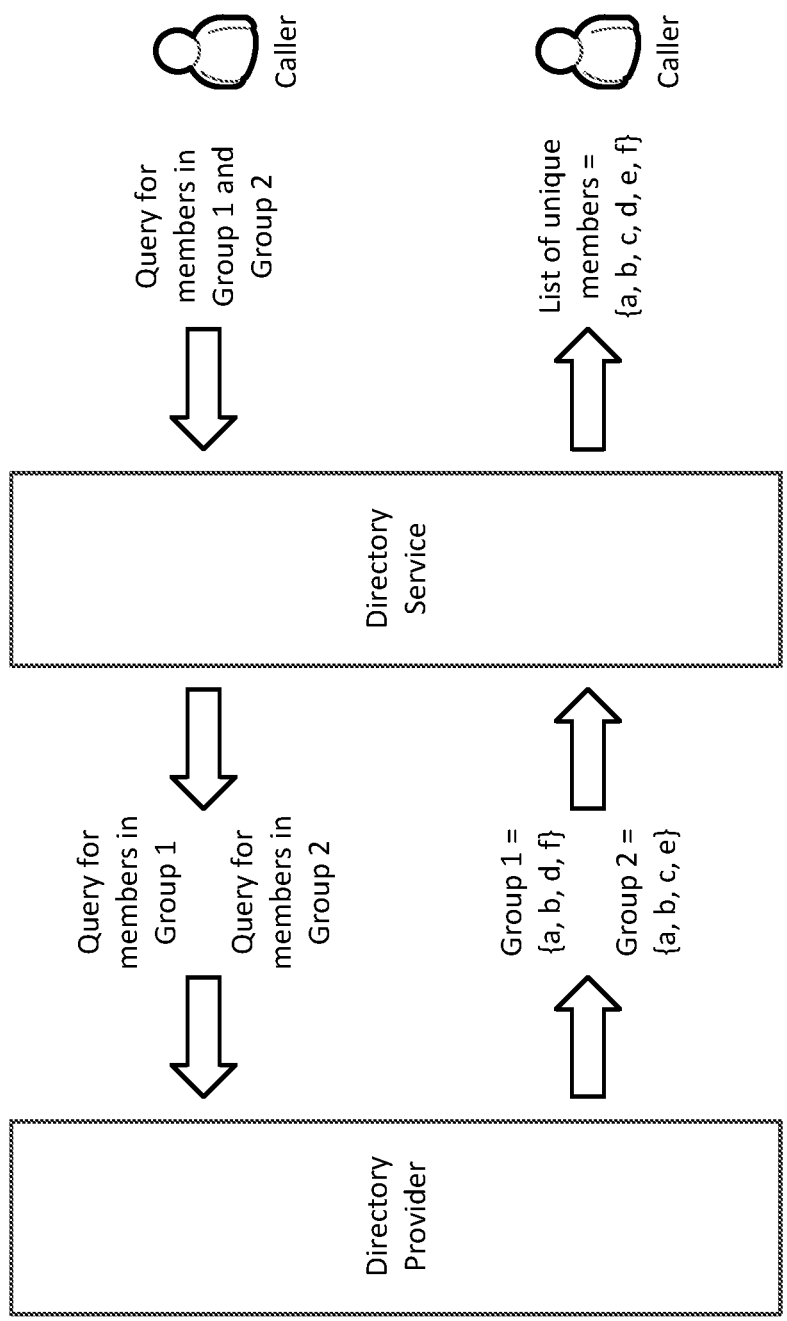
FIG. 5 is a diagram showing an example processing of membership information of multiple groups to generate group membership information that includes a list of unique members in the multiple groups, in accordance with an embodiment of the present disclosure.

FIG. 5 is a diagram showing an example processing of membership information of multiple groups to generate group membership information that includes a list of unique members in the multiple groups, in accordance with an embodiment of the present disclosure. A directory service may receive a query for members in multiple groups from a caller. The caller may be a human user or an executing application program, for example, utilizing the services provided by the directory service. A group may be a collection of objects, such as users, computers, other groups (i.e., nested groups, and other directory provider objects, and a member may be any object included in a group. Thus, a query for members in multiple groups is a request to determine the objects in at least one of the multiple groups.

As can be seen in the example of FIG. 5, the directory service may receive a query for members in two groups, a Group 1 and a Group 2, from a caller. The caller may optionally specify a domain or directory provider context for use in locating the specified groups within the directory provider. In response, the directory service can generate and issue two separate queries to the directory provider for members in Group 1 and members in Group 2. For example, the directory service may generate and issue a first query for the members in Group 1 and a second query for members in Group 2. In an embodiment, the directory service may issue the multiple queries, for example, the first query and the second query, in parallel to the directory provider. In response to the issued queries, the directory service may receive from the directory provider the membership information for Group 1 and Group 2. For example, as can be seen in FIG. 5, the membership information of Group 1 may identify members a, b, d, and f, and the membership information of Group 2 may identify members a, b, c, and e. The directory service can then filter the membership information to identify and remove duplicate entries (i.e., duplicate members). For example, the directory service can remove the duplicate entries a and b from the membership information and generate a list of unique members a, b, c, d, e, and f. The directory service can then return or otherwise provide the list of unique members to the caller as a response to the caller's query.

In some cases, the caller may not specify a domain with the query. In such cases and according to an embodiment, the directory service can identify the domains that are known or otherwise supported by the directory service and traverse the specified groups within each identified domain for membership information. For example, the directory service can generate and issue multiple queries for members in the specified groups to each respective directory provider associated with the identified domains. In an embodiment, the directory service can issue the queries to the respective directory providers in parallel. Upon receiving the membership information for the specified groups within the identified domains, the directory service can process the membership information for each domain separately (e.g., filter the membership information to remove duplicate entries), and generate a list of unique members in the specified groups within each domain. For example, assuming a Domain X and a Domain Y, the directory service can generate a list of unique members in the specified groups within Domain X, and a list of unique members in the specified groups within Domain Y. The directory service can then return or otherwise provide the lists of unique members (e.g., the list of unique members from Domain X and the list of unique members from Domain Y) to the caller in response to the caller's query.

FIG. 6A is a diagram showing an example group context object, in accordance with an embodiment of the present disclosure. The group context object may be a key-value pair object, where the key is a unique group identifier (ObjectId) and domain or directory provider context (DirectoryContext) combination and the value is an object that stores state information regarding the traversal of a group associated with (identified by) the group context object. The domain (directory provider context) provides information to locate the group within a directory provider. To this end, and as can be seen, the group context object may be a data structure that includes a group identifier (ObjectId) value, a state (State) value, a skip (Skip) value, and a domain identifier (DirectoryContext) value. The group identifier may identify a group. The domain identifier may identify a domain or directory context within a directory provider. Note that a group may be included in multiple domains. As such, the domain identifier identifies the domain containing the group. The state may indicate the state of the traversal for the group associated with the group context object (i.e., the group identified by the ObjectId and DirectoryContext combination). In one implementation, the state may be set to a value that indicates 'In Progress', 'Exhausted', or 'Not Found'. The state 'In Progress' may indicate that the group associated group context object is being or needs to be traversed. The state 'Exhausted' may indicate that the group associated group context object has been fully traversed. The state 'Not Found' may indicate that the group associated group context object does not exist or cannot be found within the identified domain. The skip value may indicate the extent of the traversal within the group associated with the group context object. For instance, in the context of paginated group membership information and a continuation token, the skip value may indicate the number of members in the group that has been returned or otherwise provided to the caller in response to a query for group membership information. In this case, the skip value may indicate the number of members to skip over in the group when processing a subsequent query with the continuation token. That is, the skipped over members have already been traversed (e.g., reported as being within the group) and need not be traversed again.

FIG. 6B is a diagram showing an example group contexts hashset, in accordance with an embodiment of the present disclosure. The group contexts hashset may include (e.g., hold) state information regarding the processing of a query for members in multiple groups. As such, in one implementation, the directory service may generate a group contexts hashset for each query from a caller for members in multiple groups. The group contexts hashset may function or serve as a group contexts dictionary that includes the groups and nested groups that have been identified during the traversal of groups in processing a query for members in multiple groups. To this end, in an example embodiment, the group context hashset is one example of a group contexts dictionary. As can be seen in FIG. 6B, the group contexts hashset may be a data structure that includes one or more key-value pair objects, where key is a unique group identifier (ObjectId) and domain or directory provider context (DirectoryContext) combination and the value is a group context object.

FIG. 6C is a diagram showing an example job stack, in accordance with an embodiment of the present disclosure. The job stack may include the items of work that need to be completed in processing a query for members in multiple groups. Similar to the group contexts hashset described above, the job stack may include (e.g., hold) state information regarding the processing of a query for members in multiple groups. As such, in one implementation, the directory service may generate a job stack for each query from a caller for members in multiple groups. To this end, and as can be seen, the job stack may be a data structure that includes none, one or more group context hashset keys, where each group context hashset key identifies a group context object in the group contexts hashset (i.e., group contexts dictionary).

Figure 7:
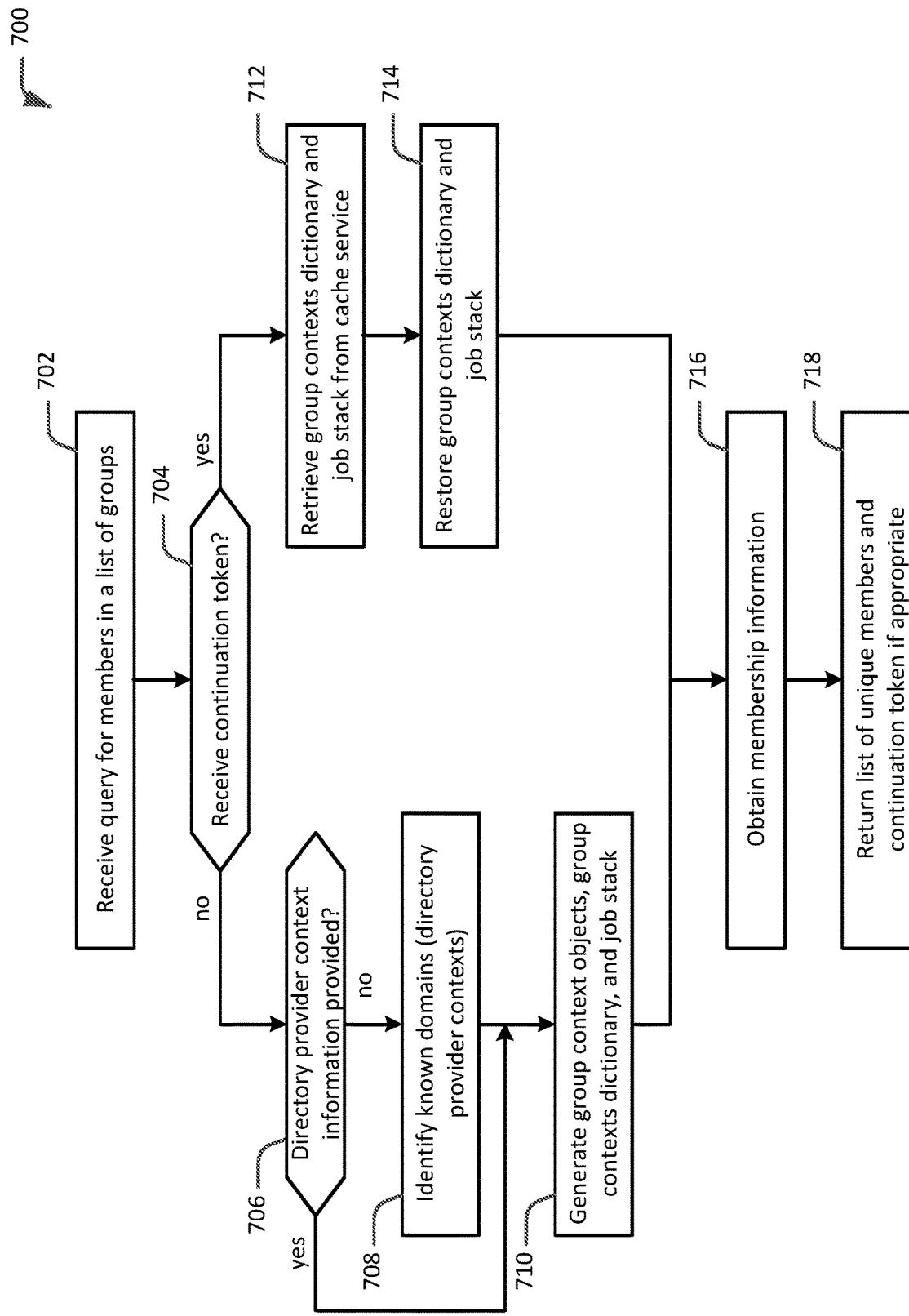
FIG. 7 is a flow diagram illustrating an example process for processing a query for members in multiple groups, in accordance with an embodiment of the present disclosure.

FIG. 7 is a flow diagram illustrating an example process 700 for processing a query for members in multiple groups, in accordance with an embodiment of the present disclosure. The operations, functions, or actions illustrated in example process 700, and example processes 800 and 900 further described below, may in some embodiments be performed by a directory service as variously described herein. The operations, functions, or actions illustrated in example process 700, and example processes 800 and 900 further described below, may also be stored as computer-executable instructions in a computer-readable medium, such as volatile memory 306 and/or non-volatile memory 308 of computing device 300 of FIG. 3.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

With reference to example process 700 of FIG. 7, at operation 702, the directory service receives a query for members in multiple groups (e.g., a list of groups). In one implementation, each group included in the query may be identified by a group identifier. For example, the query may be made by a caller, such as a human user or an executing application program, for example, utilizing the services provided by the directory service. In one implementation, each group included in the query may be identified by a group identifier.

At operation 704, the directory service checks to determine whether a continuation token is provided with the received query. If a continuation token is not provided with the received query, then at operation 706, the directory service checks to determine whether directory provider context information is provided with the query. The directory provider context information may identify or otherwise specify a domain and is needed to locate the groups within the directory provider. If the directory provider context information is not provided, then, at operation 708, the directory service identifies the domains that are known or otherwise supported by the directory service. In this case, in one implementation, the directory service may traverse the multiple groups specified in the received query within each domain to determine the group membership of the specified groups for each of the identified domains.

In any case (whether or not directory provider context information is provided), at operation 710, the directory service generates group context objects, a group contexts dictionary, and a job stack. In one implementation, the directory service may generate a group context object for each group specified in the received query. More particularly, a group context object may be generated for each instance of a group within a domain. As a result, there is a one-to-one correspondence between a group within a domain and a group context object. The group contexts dictionary and the job stack include state information regarding the processing of the received query. At the start of processing of the received query, the group contexts dictionary includes the group context objects associated with the groups specified in the received query, and the job stack includes the group context hashset keys that identify the respective group context object associated with the groups specified in the received query. For example, assuming the received query is for members of Group A and Group B, the group contexts dictionary initially includes a group context object associated with Group A and a group context object associated with Group B, and the job stack includes a group context hashset key identifying the group context object associated with Group A and a group context hashset key identifying a group context object associated with Group B. In the case where directory provider context information is not provided with the received query, the directory service may similarly generate group context objects, a group contexts dictionary, and a job stack for each domain identified by the directory service.

Otherwise, if, at operation 704, a determination is made that a continuation token is provided with the received query, then, at operation 712, the directory service uses the continuation token to retrieve the group contexts dictionary and the job stack from a cache service. In one implementation, the continuation token is used in the context of paginated group membership information where a portion (e.g. a page of member information) of the members have been provided to the caller in response to a query for members in multiple groups. In this case, the caller may use the continuation token to request another page of member information (e.g., additional members in the previously multiple groups specified in a previous query to the directory service). The continuation token includes information that may be used to identify or otherwise access the group contexts dictionary and the job stack in the cache service. In an implementation where an entity external to the directory service provides the cache service, the directory service may use the continuation token to obtain or otherwise access the group contexts dictionary and the job stack. In an implementation where the directory service provides the cache service, the group contexts dictionary and the job stack may be stored in cache (e.g., high performance memory) and the continuation token may indicate how to access the group contexts dictionary and the job stack in the cache.

At operation 714, the directory service restores the group contexts dictionary and the job stack based on the retrieved group contexts dictionary and job stack. This restores the state of the traversals of the groups to a state at the time of generation of the continuation token (e.g., state at the time of ceasing the traversals of the groups to respond to a previous query).

At operation 716, the directory service obtains membership information of the specified groups in the received query. In one implementation, the directory service may generate and issue queries to the directory provider to obtain the membership information. Obtaining membership information is further described below with respect to FIG. 8.

At operation 718, the directory service returns a list of unique members to the caller in response to the received query. In the case where the returned list is a paginated or partial list of unique members, the directory service also provides to the caller a continuation token. The directory service may also return a list of groups from the requested groups (the groups specified in the caller's query) that were not found. In one implementation, the directory service may return a null token to indicate to the caller that all groups that need to be traversed have been exhausted (i.e., traversed). Generating a list of unique members is further described below with respect to FIG. 9.

Figure 8A:
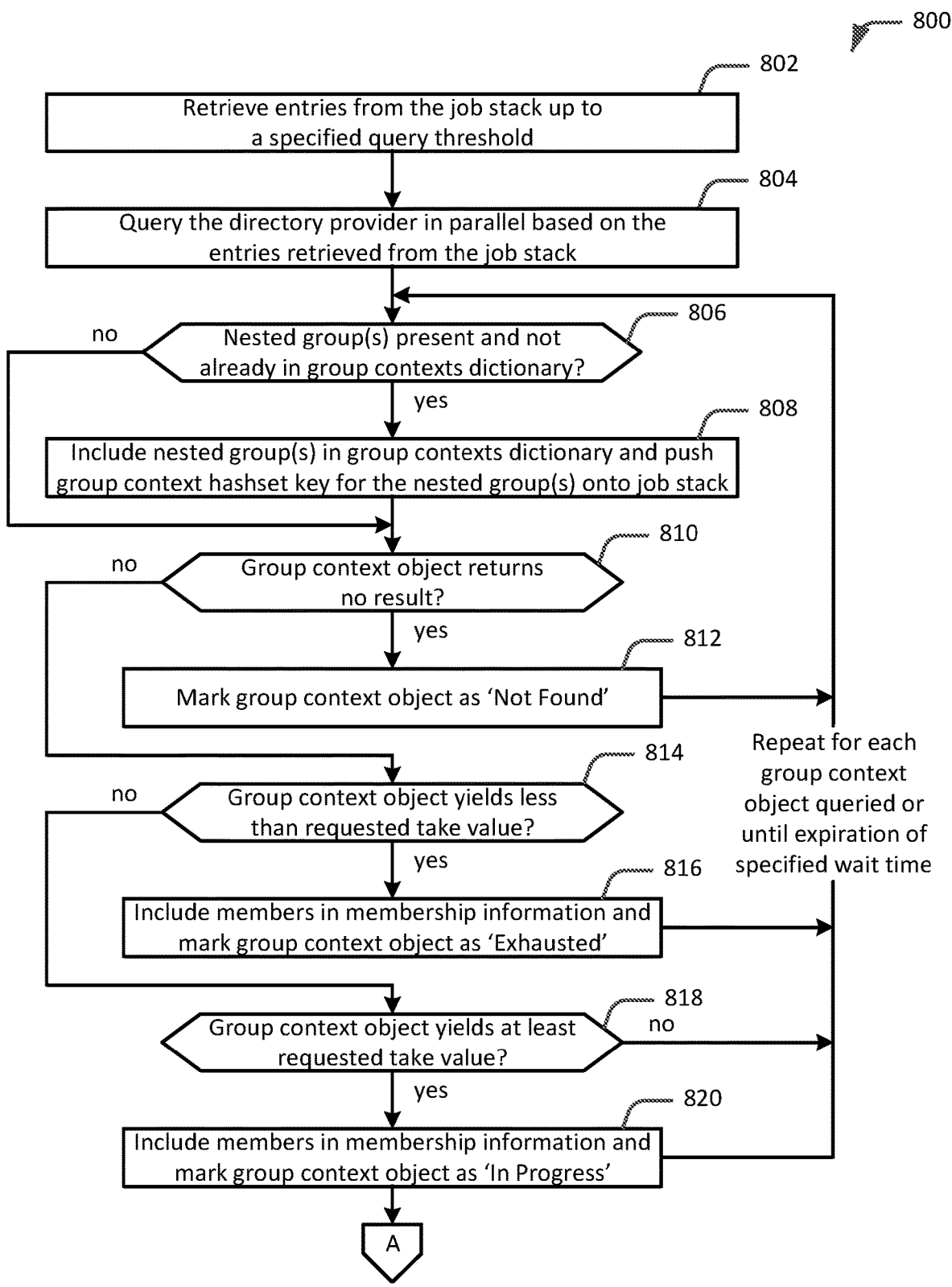
FIGS. 8A and 8B are a flow diagram illustrating an example process for obtaining membership information of multiple groups, in accordance with an embodiment of the present disclosure.
Figure 8B:
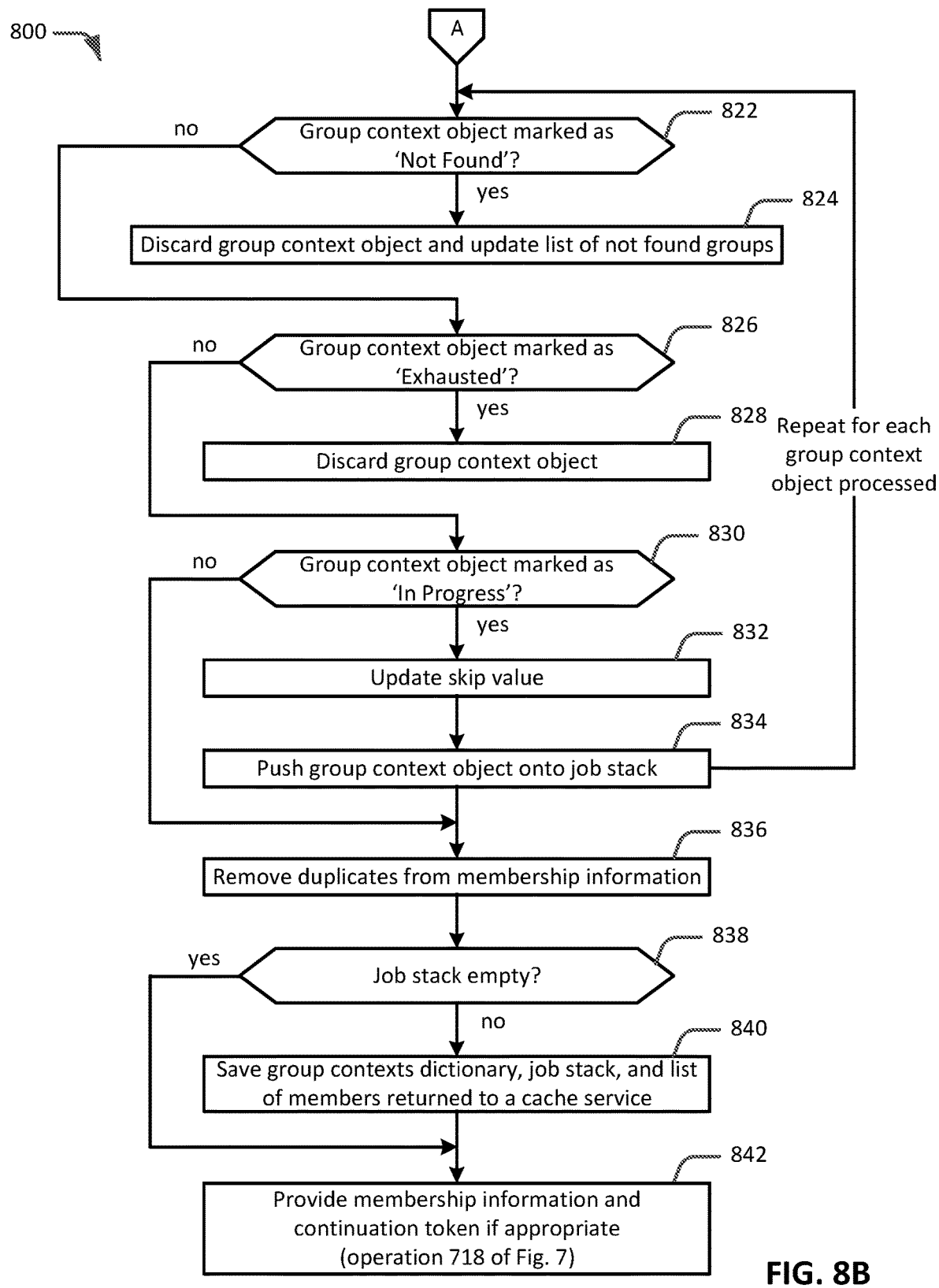

FIGS. 8A and 8B are a flow diagram illustrating an example process 800 for obtaining membership information of multiple groups, in accordance with an embodiment of the present disclosure. At operation 802, the directory service retrieves a specified query threshold number of entries (group context hashset keys) from the job stack. The query threshold number indicates the number of queries to the directory provider that can be made in parallel. For example, suppose the specified query threshold number is 10. In this case, the directory service can retrieve up to 10 entries from the job stack. The query threshold number may be preconfigured, for example, by a provider of the directory service. In some embodiments, the query threshold number may be a tunable parameter. For example, the query threshold number may be specified in a configuration file that is accessible by the directory service, and an authorized user (such as a system administrator) may tune or adjust the query threshold number based on a desired performance of the directory service. For example, a user can tune the query threshold number based on factors such as the directory provider's service performance, throttling limitations, or response time tolerance, to name a few examples. Note that, in the case of multiple directory providers, a query threshold number may be specified for each directory provider. Also note that the specified query threshold number may be the same or different for the various directory providers.

At operation 804, the directory service queries the directory provider in parallel based on the entries retrieved from the job stack. For example, assuming 10 entries are retrieved from the job stack, the directory service may generate and issue 10 queries to the directory provider in parallel, one query for each entry retrieved from the job stack. Continuing the example, suppose one entry retrieved from the job stack is a group context hashset key identifying the group context object associated with Group A. In this case, the directory service may generate and issue a query to the directory provider for the members in Group A. Similarly, if another entry retrieved from the job stack is a group context hashset key identifying the group context object associated with Group B, the directory service may generate and issue a query to the directory provider for the members in Group B.

In one implementation, the directory service may provide a take value with the query to the directory provider. For example, the directory provider may support a form of range retrieval, which allows a user to specify a number of values and/or a range of values that is to be returned in response to a query. The directory service may specify a take value that indicates the number of values (e.g., number of members) that is to be returned by the directory provider in response to the query from the directory service. In some cases, the directory service may specify a take value that indicates a range of indexes (e.g., $101^{st}$ member to $150^{th}$ member that is identified) that is to be returned by the directory provider in response to the query from the directory service. In some embodiments, the take value may be a tunable parameter. For example, the take value may be specified in a configuration file that is accessible by the directory service, and an authorized user (such as a system administrator) may tune or adjust the take value based on a desired performance of the directory service. For example, a user can tune the take value based on factors such as the query performance of the directory provider take limits from the directory provider, or response time tolerance, to name a few examples. Note that, in the case of multiple directory providers, a take value may be specified for each directory provider. Also note that the specified take value may be the same or different for the various directory providers.

At operation 806, the directory service checks to determine whether a result returned by the directory provider includes a nested group (or nested groups) and, for each nested group, whether the nested group is already included in the group contexts dictionary. For example, a group specified in a query to the directory provider may include a nested group. Since a nested group is a member of a group that is being traversed for group membership, the nested group needs to be traversed to determine the group membership of the group. However, the nested group may have already been identified as needing to be traversed.

If a nested group is present and not included in the group contexts dictionary, then, at operation 808, the directory service generates a group context object for the nested group and sets the state value in the group context object to 'In Progress'. The directory service includes the group context object for the nested group in the group contexts dictionary to indicate that the group associated with the group context object has been identified. The directory service pushes a group context hashset key identifying the group context object onto the job stack to indicate that the group associated with the group context object identified by the group context hashset key needs to be traversed. The directory service generates a group context object, includes the group context object in the group contexts dictionary, and pushes a group context hashset key identifying the group context object onto the job stack for each nested group that is present and not included in the group contexts dictionary.

At operation 810, the directory service checks to determine whether the group context object returned no result. More particularly, the directory service checks to determine whether the query to the directory provider for the members in the group associated with the group context object returns no result or an error result. If the group context object returns no result, then, at operation 812, the directory service marks the state value in the group context object to 'Not Found'. Marking the state value to 'Not Found' indicates that the group associated with the group context object does not exist or cannot be found by the directory provider.

Otherwise, if, at operation 810, the group context object returns a result, then, at operation 814, the directory service checks to determine whether the group context object yields less than the requested take value. More particularly, the directory service checks to determine whether the query to the directory provider for the members in the group associated with the group context object returns less than the requested take value number of members. If the group context object yields less than the requested take value, then, at operation 816, the directory service includes the members returned by the directory provider in the membership information and marks the state value in the group context object to 'Exhausted'. Marking the state value to 'Exhausted' indicates that the group associated with the group context object has been fully traversed to determine membership information.

Otherwise, if, at operation 814, the group context object yields not less than the requested take value, then, at operation 818, the directory service checks to determine whether the group context object yields at least the requested take value. More particularly, the directory service checks to determine whether the query to the directory provider for the members in the group associated with the group context object returns at least the requested take value number of members. If the group context object yields at least the requested take value, then, at operation 820, the directory service includes the members returned by the directory provider in the membership information and marks the State value in the group context object to 'In Progress'. Marking the state value to 'In Progress' indicates that the group associated with the group context object still needs to be traversed to possibly identify additional members.

Note that, in some cases, the directory service may not specify a take value with the query to the directory provider. In such cases, the directory service includes the members returned by the directory provider in the membership information and marks the state value in the group context object to 'In Progress'. Then, if a subsequent query to the directory provider for members in the particular groups yields no additional members, the directory service can mark the state value in the group context object to 'Exhausted'.

Operations 806 to 820 can be repeated for each group context object query issued by the directory service to the directory provider. In some embodiments, operations 806 to 820 can be repeated for each group context object query issued by the directory service to the directory provider until expiration of a specified wait time. The specified wait time indicates a time duration for querying the directory provider to obtain membership information. The wait time may be set to a suitable value, such as 1 second, 1.25 seconds, 1.5 seconds, 2 seconds, or any other suitable value. The wait time value may be a tunable parameter. For example, the wait time value may be specified in a configuration file that is accessible by the directory service, and an authorized user (such as a system administrator) may tune or adjust the wait time value based on the administrator's level of tolerance or a desired performance of the directory service.

At operation 822, the directory service checks to determine whether a group context object is marked as 'Not Found'. More particularly, the state value in the group context object is checked to determine if it is marked 'Not Found'. If the group context object is marked as 'Not Found', then, at operation 824, the directory service discards the group context object. In some embodiments, the directory service may update a list of not found groups to include the group associated with the group context object. The list of not found groups includes the groups that are queried by the caller but not found in the domain, for instance.

Otherwise, if the group context object is not marked as 'Not Found', then, at operation 826, the directory service checks to determine whether the group context object is marked as 'Exhausted'. More particularly, the state value in the group context object is checked to determine if it is marked 'Exhausted'. If the group context object is marked as 'Exhausted', then, at operation 828, the directory service discards the group context object.

Otherwise, if the group context object is not marked as 'Exhausted', then, at operation 830, the directory service checks to determine whether the group context object is marked as 'In Progress'. More particularly, the state value in the group context object is checked to determine if it is marked 'In Progress'. If the group context object is marked as 'In Progress', then, at operation 832, the directory service updates the skip value in the group context object. For example, the skip value may be updated based on the number of members in the group returned by the directory provider in response to the query issued by the directory service to the directory provider. At operation 834, the directory service pushes the group context object onto the job stack to indicate that the group associated with the group context object needs to be further traversed. More particularly, the directory service pushes the group context hashset key identifying the group context object onto the job stack.

Operations 822 to 834 can be repeated for each group context object that is being processed by the directory service in response to the query from the caller.

At operation 836, the directory service removes duplicate entries from the membership information. In one implementation, the directory service may remove the duplicate entries from the membership information to generate a list of unique members. Processing of the membership information to generate a list of unique members is further described below with respect to FIG. 9.

At operation 838, the directory service checks to determine whether the job stack is empty. Note that the job stack may be seen as a mechanism that maintains the amount of work left to be performed by the directory service to process a query from a caller for members in multiple groups. To this end, the discovery of a nested group grows the job stack, while exhausted or non-existent group context objects (groups) shrinks the job stack. As will be appreciated in light of this disclosure, eventually, when the job stack becomes empty, all groups and nested groups have been traversed and exhausted, and members from these groups and nested groups have been reported to the caller across, possibly, one or more paginated responses (e.g., one or more pages of membership information).

If the job stack is not empty, then, at operation 840, the directory service saves the group contexts dictionary, the job stack, and a list of members returned to a cache service. The list of members returned is a superset of all members from all groups, including all nested groups, that have been processed for membership and whose members have already been provided to the caller. The cache service may generate and provide to the directory service a continuation token that includes information to retrieve the group contexts dictionary, the job stack, and the list of members returned from a cache service. Thus, the continuation token allows the directory service to restore the state of the traversals of the groups when processing a subsequent query from the caller that includes the continuation token.

At operation 842, the directory service provides the membership information and the continuation toke, if appropriate. The membership information includes a list of unique members.

Figure 9:
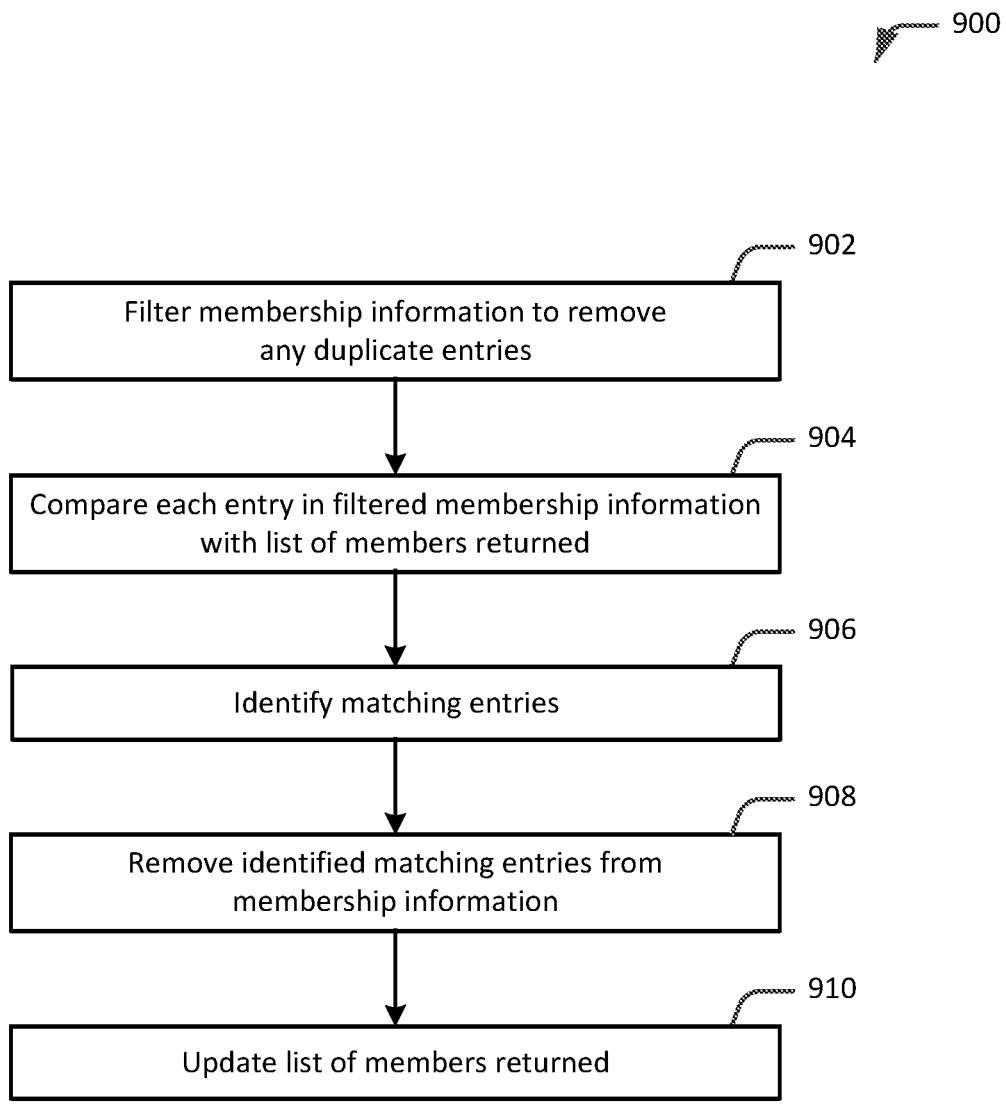
FIG. 9 is a flow diagram illustrating an example process for processing membership information to remove duplicate entries, in accordance with an embodiment of the present disclosure.

FIG. 9 is a flow diagram illustrating an example process 900 for processing membership information to remove duplicate entries, in accordance with an embodiment of the present disclosure. At operation 902, the directory service filters the membership information to remove any duplicate entries.

At operation 904, the directory service compares each entry (identified or otherwise indicated member) in the filtered membership information with the list of members returned. As described above, the list of members returned is a superset of all members from all groups, including all nested groups, that have been processed for membership and whose members have already been provided to the caller. Comparing the filtered membership information to this list allows for removing members from the membership information members that have already been returned to the caller.

At operation 906, the directory service identifies any matching entries in the filtered membership information. The identified entries are the entries in the filtered membership information that match an entry in the list of members returned.

At operation 908, the directory service removes the identified matching entries from the membership information. As a result, the membership information includes a list of unique members.

At operation 910, the directory service updates the list of members returned. For example, the list of members returned may be updated to include the members in the membership information generated at operation 908.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
   responsive to a query for members in a plurality of groups,
       generating a group contexts dictionary, the group contexts dictionary including a plurality of group context objects, each group context object associated with a group within a domain;
       generating a job stack, the job stack including one or more group context hashset keys, wherein a group context hashset key identifies a group context object;
       retrieving one or more group context hashset keys from the job stack;
       for each retrieved group context hashset key from the job stack, traversing a group associated with a group context object identified by a group context hashset key to determine membership information of the group;
       generating a list of unique members by removing duplicate entries in the membership information; and
       causing generation of a response to the query for members in the plurality of groups, the response including the list of unique members; and
   responsive to a subsequent query for members in the plurality of groups, the query including a continuation token, wherein the continuation token includes information for restoring a state of the traversals of the groups,
       restoring the group contexts dictionary and the job stack from a cache based on the continuation token; and
       resuming the traversals of the groups based on the restored group contexts dictionary and the job stack to determine membership information of the groups.

2. The method of claim 1, wherein the list of unique members is paginated group membership information, the method further comprising:
   generating a list of members returned, wherein the list includes the members in the plurality of groups returned in response to one or more previous queries;
   saving the group contexts dictionary, the job stack, and the list of members returned to a cache;

generating a continuation token, the continuation token including information for restoring a state of the traversals of the groups; and including the continuation token with the response to the query for members in the plurality of groups such that the continuation token is included in a subsequent query for additional members in the plurality of groups.

3. The method of claim 1, wherein traversing a group yields a nested group, the method further comprising:

responsive to a determination that the nested group is not in the group contexts dictionary,
including the nested group in the group contexts dictionary; and
pushing a group context hashset key identifying a group context object associated with the nested group onto the job stack.

4. The method of claim 1, wherein the retrieved group context hashset keys includes a first group context hashset key identifying a first group context object associated with a first group and a second group context hashset key identifying a second group context object associated with a second group, the method further comprising traversing the first group by issuing a first query to a directory provider for members of the first group, and traversing the second group by issuing a second query to the directory provider for members of the second group.

5. The method of claim 4, wherein the first query and the second query are issued in parallel.

6. The method of claim 1, wherein traversing a group includes issuing a query to a directory provider for members of the group, wherein the query specifies a take value.

7. The method of claim 1, wherein generating a list of unique members includes comparing the membership information with a list of members returned, identifying matching entries in the membership information, and removing the identified matching entries from the membership information.

8. The method of claim 1, further comprising, responsive to a determination that a group traversal yields less than a requested take value number of members, marking the group context object associated with the group as being exhausted, and discarding the group context object.

9. The method of claim 1, further comprising, responsive to a determination that a group traversal returns no result, marking the group context object associated with the group as being not found, and discarding the group context object.

10. The method of claim 1, further comprising, responsive to a determination that a group traversal returns at least a requested take value number of members, marking the group context object associated with the group as being in progress, and updating a skip value associated with the group context object, wherein the skip value indicates a number of members in the group to skip for subsequent queries for members in the plurality of groups.

11. The method of claim 1, further comprising:
identifying a plurality of domains; and
traversing the plurality of groups within each of the plurality of domains to determine membership information of the plurality of groups for each of the plurality of domains.

12. A non-transitory machine-readable medium encoding instructions that when executed by one or more processors cause a process to be carried out, the process comprising:
responsive to a query for members in a plurality of groups,
generating a group contexts dictionary, the group contexts dictionary including a plurality of group context objects, each group context object associated with a group within a domain;
generating a job stack, the job stack including one or more group context hashset keys, wherein a group context hashset key identifies a group context object;
retrieving one or more group context hashset keys from the job stack;
for each retrieved group context hashset key from the job stack, traversing a group associated with a group context object identified by a group context hashset key to determine membership information of the group;
generating a list of unique members by removing duplicate entries in the membership information; and
causing generation of a response to the query for members in the plurality of groups, the response including the list of unique members; and
responsive to a subsequent query for members in the plurality of groups, the query including a continuation token, wherein the continuation token includes information for restoring a state of the traversals of the groups,
restoring the group contexts dictionary and the job stack from a cache based on the continuation token; and
resuming the traversals of the groups based on the restored group contexts dictionary and the job stack to determine membership information of the groups.

13. The non-transitory machine-readable medium of claim 12, wherein the list of unique members is paginated group membership information, the process further comprising:

generating a list of members returned, wherein the list includes the members in the plurality of groups returned in response to one or more previous queries;
saving the group contexts dictionary, the job stack, and the list of members returned to a cache;
generating a continuation token, the continuation token including information for restoring a state of the traversals of the groups; and
including the continuation token with the response to the query for members in the plurality of groups such that the continuation token is included in a subsequent query for additional members in the plurality of groups.

14. The non-transitory machine-readable medium of claim 12, wherein traversing a group yields a nested group, the process further comprising:
responsive to a determination that the nested group is not in the group contexts dictionary,
including the nested group in the group contexts dictionary; and
pushing a group context hashset key identifying a group context object associated with the nested group onto the job stack.

15. A system comprising:
a memory; and
one or more processors in communication with the memory and configured to,
responsive to a query for members in a plurality of groups,
generate a group contexts dictionary, the group contexts dictionary including a plurality of group context objects, each group context object associated with a group within a domain;

generate a job stack, the job stack including one or more group context hashset keys, wherein a group context hashset key identifies a group context object;

retrieve one or more group context hashset keys from the job stack;

for each retrieved group context hashset key from the job stack, traverse a group associated with a group context object identified by a group context hashset key to determine membership information of the group;

generate a list of unique members by removing duplicate entries in the membership information; and cause generation of a response to the query for members in the plurality of groups, the response including the list of unique members; and responsive to a subsequent query for members in the plurality of groups, the query including a continuation token, wherein the continuation token includes information for restoring a state of the traversals of the groups, restore the group contexts dictionary and the job stack from a cache based on the continuation token; and resume the traversals of the groups based on the restored group contexts dictionary and the job stack to determine membership information of the groups.

16. The system of claim 15, wherein the list of unique members is paginated group membership information, the one or more processors in communication with the memory further configured to:

generate a list of members returned, wherein the list includes the members in the plurality of groups returned in response to one or more previous queries;

save the group contexts dictionary, the job stack, and the list of members returned to a cache;

generate a continuation token, the continuation token including information for restoring a state of the traversals of the groups; and include the continuation token with the response to the query for members in the plurality of groups such that the continuation token is included in a subsequent query for additional members in the plurality of groups.

17. The system of claim 15, wherein to traverse a group yields a nested group, the one or more processors in communication with the memory further configured to:

responsive to a determination that the nested group is not in the group contexts dictionary, include the nested group in the group contexts dictionary; and push a group context hashset key identifying a group context object associated with the nested group onto the job stack.

* * * * *